P. COAD.
GRADUATED GALVANIC BATTERY.
No. 2,521. Patented Mar. 28, 1842.
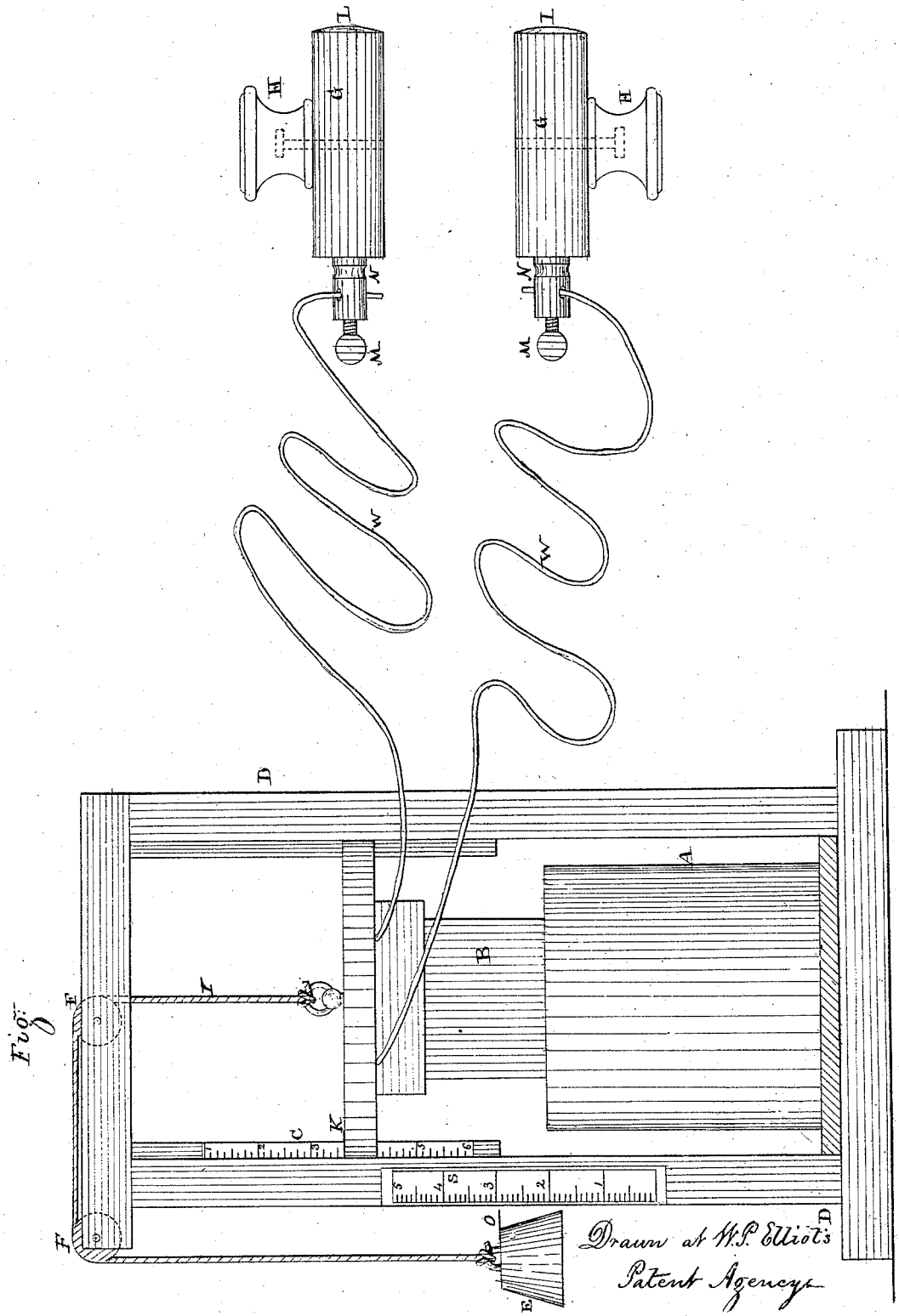
Drawn at W.P. Elliot's Patent Agency

UNITED STATES PATENT OFFICE.

PATRICK COAD, OF PHILADELPHIA, PENNSYLVANIA.

IMPROVEMENT IN THE MODE OF CONSTRUCTING THE GALVANIC BATTERY SO AS TO VARY THE INTENSITY OF ITS EFFECT, AND IN THE CONSTRUCTION OF INSULATED CONDUCTORS APPLIED TO THE SAME FOR ADAPTING IT TO MEDICAL PURPOSES.

Specification forming part of Letters Patent No. 2,521, dated March 28, 1842.

*To all whom it may concern:*

Be it known that I, PATRICK COAD, of the district of Southwark, in the county of Philadelphia and State of Pennsylvania, have invented a new and useful Improvement in the Construction of the Galvanic Battery for Medical and other Purposes, which is described as follows, reference being had to the annexed drawing of the same, making part of this specification.

The nature of this invention and improvement consists in combining a graduated cell or trough with the battery, so that by depressing or elevating the latter the intensity of the effect produced may be varied, having a scale on the frame which contains the trough, or on any other convenient part of the apparatus, and an index on the top of the battery pointing to said scale, by which the part of the battery sufficient to be depressed in the dilute sulphuric acid or any liquid to be used may always be known, and consequently the intensity or quantity of the electric fluid sufficient to suit the patient or any other purpose that may be required. The top of the weight in the present model forms the index, and making use of any of the known mechanical means, such as weights, cords, and pulleys, or rack and pinions or screws; also, in the mode of insulating the wires by means of metallic cylinders provided with glass handles.

To enable persons skilled in the art of which this is a branch to make and use said invention, I shall proceed to give a description of the same.

Figure 1 in the annexed drawing is an elevation of the battery, &c.

The trough A, frame D, battery B, and wires W are made in the usual manner.

The battery B is suspended from the top of the frame D by a cord, I, passed over pulleys F F, turning on horizontal axles in said top of the frame. A weight, E, is appended to the extremity of the said cord, which acts as a counter-balance to the battery.

A vertical scale, C, of inches and parts of inches is attached to one of the uprights of the frame or to the outside of the trough, by which the position of the battery in the trough and the quantity of the surface of the battery acted on by the dilute sulphuric acid are exactly measured and the strength of the electric fluid arising therefrom then ascertained and thereby brought under the control of the operator. When the battery is depressed so that the quantity or intensity of the electric fluid is just enough for the patient to bear, then by noting the degree that the index coincides with on the scale that depression will be known to answer at another time for the same patient, so that any person can be taught to use the apparatus with accuracy and perfect safety to the patient, there being a pointer, K, fixed to the top of the battery for indicating the degree on the scale; or the top of the battery will answer the same purpose, the strength of the electric fluid being increased by immersing more surface of the battery and decreased by a contrary operation. A vertical scale, S, which is attached to the frame, by which the position of the battery may be ascertained from that of the weight, the bottom or top of which serving as the pointer; or a a brass pointer may be screwed to the top or bottom of the weight for pointing out the degree on the scale.

Should the cord lengthen or shorten by a change of temperature or other cause, it may be adjusted by a screw in the weight, or a screw between two parts of the cord, or by the cord itself, so that the graduation of the battery may always be kept perfectly true. The scale may be divided into degrees and applied to any convenient part of the frame or trough.

The improved insulated electro-magnetic poles are made as follows: They consist of two metallic cylinders, each one being reduced in diameter at one end, forming a neck, which is perforated to admit the wire, which is secured by a screw inserted into the end of the neck till it intersects the aperture into which the wire is inserted, and in which aperture it is held fast by said screw or other similar means, said cylinders being made convex at the large ends, and provided at the sides with glass handles, which completely insulate the wires and give the operator complete control over the electric fluid, enabling him to apply it to any part of his body, in conjunction with the graduated battery above described at any strength of shock required.

The glass handles are fixed to the metallic cylinders by means of metallic screws or spindles inserted into the cylinders and extending into the glass handles, but not through them. The dotted lines indicate the form and position of these screws or spindles.

It frequently may happen that the metallic cylinders cannot be conveniently or at all applied to the part affected to communicate the electric fluid to the patient. In such cases any forms may be substituted, these forms terminating in balls, points, disks, or plates, or any other forms required. In these forms the glass handles may be soldered or screwed on at or near the other ends. These forms may be used to great advantage to operate on the ear, the eye, the tongue, the gums, or any part to which the metallic cylinders cannot be applied. The ends L L of the metallic cylinders are made convex, to convey the electric fluid more conveniently from their central parts to any particular parts or points of the patient. If these ends be found too large or inconvenient, a pair of the other forms may be used.

The glass handles may be of any shape to suit the hands, and the screws in them may be soldered, screwed, or in any other way attached to the metallic cylinders to suit the operator.

Operation: The weight, &c., being properly adjusted, fill the trough with water, then immerse the battery therein, which will displace a quantity of water equal in magnitude to itself. Then remove the battery and mark the height of the water in the trough, on the inside thereof. This will show the quantity of dilute sulphuric acid or any other liquid that may be used in the trough. In order to have the whole surface of the battery acted on when completely immersed, empty the water and put in its place dilute sulphuric acid; bring down the battery into the trough to the degree required, the strength of the electric fluid being ascertained, and the patient intending to operate on himself will hold a glass handle in each hand and apply the metallic cylinder to the part of the body to receive the shock or stream of fluid.

If a child is to be operated on, the battery must be raised until the pointer indicates on the scale the degree required for the strength of shock to be given. The metallic cylinders are then to be applied to the part to be galvanized by means of the glass handles held in the hands of the operator, which will give the shock required. It will thus be perceived that the operator will have such a control over the electric fluid by means of this conjoint apparatus that he will be able to operate on an infant of a day old with perfect safety, or on an ox of the largest size so as to deprive him instantly of life. It will also be perceived that these improved insulated electro-magnetic poles are perfectly stable, the patient being able to hold them himself in his hands and to operate agreeably to his own feelings on any part of his body within his reach, producing any required pressure, nothing being seen but the best conductor (metal) and the best non-conductor, glass, (which may be of any form,) as before stated. Under such complete control will the electric fluid be brought that the brain of man itself can be operated on with perfect safety, which has already repeatedly been done by the inventor.

The apparatus will be found peculiarly serviceable in many diseases which are very prevalent in this country, such as rheumatism and nervous affections, to the cure of which it has recently been applied by the inventor with great success.

The insulators heretofore used for electromagnetic purposes having hollow glass cylinders run on the wires or poles and cemented, with metallic balls attached to their extremities, were liable to several objections—namely, from the cement interfering with the passage of the electric fluid, the wires bending, the apparatus being unstable, and the operator not being able to give the pressure required on the part to be galvanized.

I do not claim to be the inventor of the metallic cylinders or the screws by which the wires are attached to said cylinders; neither do I claim to be the inventor of the glass handles with metallic screws partly through; but I do claim as my invention—

1. The attaching of the glass handles to the metallic cylinders, in the manner and for the purposes specified.

2. The modes of depression and elevation of the galvanic battery, and the graduation of said battery and galvanic trough, so that the intensity of the effect produced may be varied.

PATRICK COAD.

Witnesses:
J. SNIDER,
WILLIAM SNIDER.